United States Patent [19]

Souchard

[11] 3,899,533
[45] Aug. 12, 1975

[54] CHLORINATED MANDELAMIDINES
[75] Inventor: Maddy Souchard, Champigny-Sur-Marne, France
[73] Assignee: Societe Anonyme dite: Orsymonde, Paris, France
[22] Filed: Nov. 21, 1973
[21] Appl. No.: 417,772

[30] Foreign Application Priority Data
Nov. 24, 1972 France .......................... 72.41908

[52] U.S. Cl....... 260/564 G; 260/251 R; 260/309.6;
260/343.7; 260/501.11; 260/501.12;
260/501.14; 260/564 R; 424/251; 424/273;
424/280; 424/316; 424/319; 424/326
[51] Int. Cl.² ........................................ C07C 123/00
[58] Field of Search ........ 260/564 G, 564 R, 501.14

[56] References Cited
UNITED STATES PATENTS
3,723,527   3/1973   Lafon .............................. 260/564 G
FOREIGN PATENTS OR APPLICATIONS
1,264,944   2/1972   United Kingdom ............. 260/564 G
OTHER PUBLICATIONS
Neilson et al., J. Chem. Soc. (1968), pp. 1853–1856.
Neilson et al., J. Chem. Soc., (1965), pp. 1658–1662.

Primary Examiner—Gerald A. Schwartz

[57] ABSTRACT
New chlorinated derivatives of mandelamidine and acid addition salts thereof are produced by reacting a mandeliminoalkyl ether of the formula

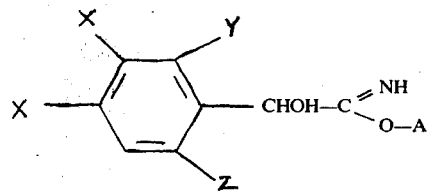

in which A is alkyl lower alkyl group, preferably $C_1$–$C_2$, and X, Y, Z represent H or Cl, one at least of the X, Y and Z being a chlorine atom, or one of the acid addition salts of the said mandeliminoalkyl ether, preferably the hydrochloride, with an amine of the formula $$HNR_1R'_2$$

in which $R_1$ is defined as above and $R'_2$ represents the hydrogen atom, a $C_1$–$C_5$ lower alkyl group, an $NH_2$ group, an OH group, it being possible for $R'_2$ to be a $(CH_2)_nNH_2$ group, in which $n$ is an integer having the value 2 or 3 when $R_1 = H$ and, if necessary, the product thus obtained, when $R_2$ is different from OH, is subjected to an esterification reaction for introducing the group R = acyl. These new derivatives are particularly useful for the treatment of hypertension.

1 Claim, No Drawings

CHLORINATED MANDELAMIDINES

The present invention is concerned, as industrial products, with new mandelamidines having one or more substituted chlorine atoms on the benzene ring and their acid addition salts. The invention is also concerned with a process for preparing the said chlorinated mandelamidines and their application for therapeutic purposes.

What is understood here by "mandelamidines" are not only the compounds having a possibly N-substituted amidino group $C(=NH)NH_2$, but also the compounds having an amidino group disposed inside a heterocyclic group, such as especially the 2-$\Delta^2$-imidazolinyl and 2-(1,4,5,6-tetrahydropyrimidinyl) radicals.

It is known that, in the past, certain mandelamidines have been described and tested on animals with a view to detecting possible pharmacological properties and that the pharmacological tests which have been undertaken have been negative, according to the publications of the authors themselves.

Thus, according to N. W. BRISTOW, J. Chem. Soc., (1957), 513–515, the 4-chloromandelamidine, 3-chloromandelamidine and 2-($\alpha$-hydroxy-4-chlorobenzyl)-$\Delta^2$-imidazoline do not have any bronchodilatory activity and, according to M. CLAESEN et al, Ind. Chim. Belge, Suppl., (1959), 2, 425–427 (cf. CA 54, 10 133 h), the 2-chloromandelamidoxime has no action in vitro on *Mycobacterium tuberculosis*.

More recently (cf. French Patent Application No. 2,036,973, published Dec. 31, 1970), it has been possible to show useful therapeutic properties for the derivatives of mandelamidine in the treatment of hypertension, and especially for te 3,4-dichloromandelamidine and 3,4-dichloromandelamidoxime.

The invention has for its object to provide new chlorinated mandelamidines which differ structurally from the prior art products as referred to above and which are at least as interesting for therapeutic use as the 3,4-methylene dioxy-mandelamidine of BSM 7744 M.

The chlorinated mandelamidines envisaged here have the general formula:

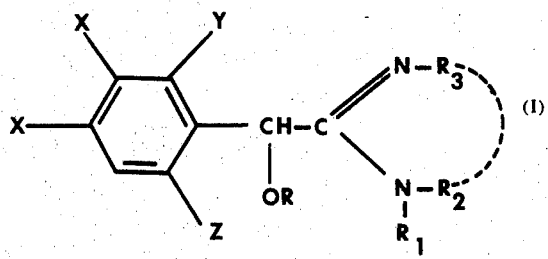

in which:
X, Y and Z each represent the hydrogen atom or the chlorine atom, one at least of the X, Y and Z being a chlorine atom;
R represents the hydrogen atom and can represent an acyl group, when $R_2$ is different from OH;
$R_1$ represents the hydrogen atom or a lower $C_1-C_5$ alkyl group;
$R_2$ represents the hydrogen atom, a lower alkyl group or an $NH_2$ group, it also being possible for $R_2$ to represent the OH group in all those cases where there is not simultaneously the position of Y = Cl and X = Z = $R_1$ = H;
$R_3$ represents the hydrogen atom, it being possible for $R_2$ and $R_3$, considered together, to form a $C_2-C_3$ alkylene chain, $R_1$ in this case being the hydrogen atom;

and their acid addition salts.

The preferred amidinocyclic groups are the 2-$\Delta^2$-imidazolinyl and 2-(1,4,5,6-tetrahydro-pyrimidinyl) groups and the preferred acyl group is an aliphatic group comprising 1 to 5 carbon atoms, a benzyl, nicotinoyl or isonicotinoyl group, the benzyl group being able to comprise substituents on the benzene ring.

The new chlorinated derivatives of the mandelamidine according to the invention are characterised in that they are selected from the group formed by 2-($\alpha$-hydroxy-2-chlorobenzyl)-$\Delta^2$-imidazoline, 2-($\alpha$-acetyloxy-2-chlorobenzyl)-$\Delta^2$-imidazoline, 3,4-dichloromandelamidrazone, 2,6-dichloromandelamidine, 2-($\alpha$-hydroxy-2,6-dichlorobenzyl)-$\Delta^2$-imidazoline, 2,6-dichloromandelamidoxime and their acid addition salts.

For preparing the compounds of formula I, it is possible to employ several methods which are known per se. The preferred synthesis process according to the invention employs, as starting material, a mandelimino-alkyl ether of formula:

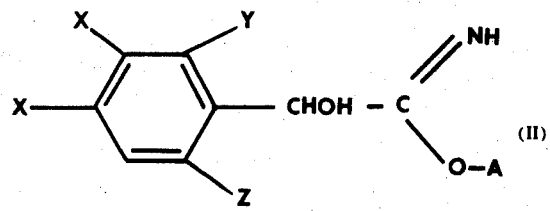

in which A is a lower alkyl group, preferably of $C_1-C_2$, and X, Y, Z represent H or Cl, at least one of the X, Y and Z being a chlorine atom or one of the acid addition salts of the said mandeliminoalkyl ether, preferably the hydrochloride.

This process comprises the reaction of a mandelimino-alkyl ether of formula II or one of its acid addition salts with an amine of formula:

$$HNR_1R'_2 \qquad (III)$$

in which $R_1$ is defined as above and $R'_2$ represents the hydrogen atom, a $C_1-C_5$ lower alkyl group, an $NH_2$ group, an OH group, it being possible for $R'_2$ to be a $(CH_2)_nNH_2$ group, in which $n$ is an integer having a value of 2 or 3 when $R_1$ = H and, if necessary, the product thus obtained, when $R_2$ is different from OH, is subjected to an esterification reaction for introducing the R = acyl group.

The reaction of the mandelimino-alkyl ether II or of one of its acid addition salts, preferably the hydrochloride, with the amine III is generally carried out in anhydrous alcoholic medium, in stoichiometric proportions or in the presence of an excess of amine III. The solvents used are generally methanol and ethanol. The reaction takes place for one hour at least, at a temperature which is between 0°C and the reflux temperature of the solvent.

The esterification reaction of the α-hydroxyl function is carried out by a method which is known per se. In particular, it is possible to cause the reaction of a compound of formula I, in which R is the hydrogen atom and $R_2$ is different from OH, with a reactant which is selected from the acid chlorides R—Cl (IV) and the acid anhydrides $(R)_2O$ (V), where R is an acyl group.

For producing the imino-alkyl ether II, a mandelaminonitrile suitably chlorinated on the benzene ring is treated by a method which is known per se with a lower alcohol in the presence of a stream of dry HCl gas, it being possible for the said mandelaminonitrile to be obtained from a chlorobenzaldehyde, as will hereinafter be seen.

The acid addition salts of the compounds of formula I can be prepared by the conventional salification methods, particularly by the free base being brought into contact with a mineral or organic acid. Among the mineral and organic acids which can be used for this purpose, it is possible particularly to mention the hydrochloric, hydrobromic, hydroiodic, sulphuric, phosphoric, carbonic, formic, oxalic, maleic, fumaric, malic, succinic, tartaric, lactic, acetic, benzoic, cinnamic, ascorbic, aspartic, N-acetyl-aspartic, glutamic, N-acetyl-glutamic, cyclohexylsulphamic, methanesulphonic and p-toluosulphonic acids.

For the treatment of hypertension, there are recommended therapeutic compositions which comprise, in association with a physiologically acceptable excipient, a pharmaceutically effective quantity of at least one compound selected from the group formed by the 2-(α-hydroxy-2-chlorobenzyl)-$\Delta^2$-imidazoline, 2-(α-acetyloxy-2-chlorobenzyl)-$\Delta^2$-imidazoline, 3,4-dichloromandelamidrazone, 2,6-dichloromandelamidine, 2-(α-hydroxy-2,6-dichlorobenzyl)-$\Delta^2$-imidazoline, 2,6-dichloromandelamidoxime, 2-(α-hydroxy-2,6-dichlorobenzyl)-1,4,5,6-tetrahydropyrimidine and their non-toxic acid addition salts.

Other advantages and features of the invention will be better understood from reading the following description concerning examples of preparation, these examples having no limiting character but having been given by way of illustration.

EXAMPLE 1—
2-(α-Hydroxy-2-chlorobenzyl)-$\Delta^2$-imidazoline hydrochloride (Formula VI)

a. Preparation of the 2-chloromandelimino-ethyl ether hydrochloride

A mixture of 28.2 g (0.2 mol) of orthochlorobenzaldehyde in 50 ml of water and 8 ml of sodium bisulphite is violently agitated and there are simultaneously added dropwise, firstly 16.2 g (0.25 mol) of KCN in 50 ml of water and secondly 38 ml (0.225 mol) of 6N HCl. The mixture is extracted with ether, washed with water and dried. 25 ml of absolute ethanol are added and saturation is effected with dry HCl gas. The mixture is left overnight in the refrigerator, hydroextracted and washed with ether. There are obtained 32 g of iminoethyl ether hydrochloride. M.p. 158°–160°C.

b. Preparation of the 2-(α-hydroxy-2-chlorobenzyl)-$\Delta^2$-imidazoline hydrochloride A solution of 25 g (0.1 mol) of the preceding hydrochloride and 6 ml of ethylene diamine in 80 ml of absolute ethanol is heated for 2 hours. It is hydroextracted and recrystallised from methanol. The 2-(α-hydroxy-2-chlorobenzyl)-$\Delta^2$-imidazoline hydrochloride is obtained.

Yield: 48 %

M.p. 262°–265°C (with decomposition).

This product, which is obtained in the form of white crystals is soluble in water and methanol, sparingly soluble in ethanol and insoluble in acetone, ethyl acetate and ether.

EXAMPLE 2—
2-(α-Acetyloxy-2-chlorobenzyl)-$\Delta^2$-imidazoline hydrochloride (Formula VII)

To a suspension of 9 g (0.036 mol) of 2-(β-hydroxy-2-chlorobenzyl)-$\Delta^2$-imidazoline hydrochloride in 40 ml of acetic acid are added 4 ml (0.04 mol) of acetic anhydride and the mixture is heated for 4 hours under reflux (a solution is obtained after about half an hour). This is evaporated to dryness under vacuum, the distillation residue is taken up in acetone, hydroextracted and recrystallized from ethanol.

Yield: 95 %

M.p. about 280°C (with decomposition).

This product, which is obtained in the form of small matted needles, is soluble in water, methanol and ethanol and insoluble in ether and acetone.

EXAMPLE 3—
3,4-Dichloromandelamidrazone hydrochloride (formula VIII)

Into a 250 ml single-neck spherical flask above which is arranged a calcium chloride trap and provided with a magnetic stirrer mechanism are introduced 20 g (0.074 mol) of 3,4-dichloromandelimino-ethyl ether hydrochloride and 120 ml of ethanol. The solution is cooled to a temperature which is between 0° and 5°C and then 3.5 g (0.07 mol) of hydrazine monohydrate in solution in 40 ml of ethanol are added all at once, while keeping the temperature between 0° and 5°C.

After being left in contact for 1 hour in the cold, a few drops of hydrochloric alcohol are added for passing into clearly acid medium, then the solution is evaporated to dryness under reduced vacuum. The residue is taken up in 250 ml of water. The aqueous solution obtained is washed with 5 × 100 ml of ether and then evaporated to dryness. The residue is taken up in isopropyl alcohol, which leaves an insoluble substance, which is filtered and then removed, and the limpid alcoholic solution is likewise evaporated. This last evaporation residue, taken up in ethyl acetate, permits 6.5 g of 3,4-dichloromandelamidrazone hydrochloride to be deposited.

Yield: 69 %

M.p. (hydrochloride) : 179°–180°C

M.p. (free base) : 122°C.

EXAMPLE 4
2,6-Dichloromandelamidine hydrochloride (Formula IX)

a. Preparation of the 2,6-dichloromandelonitrile 35 g (0.2 mol) of 2,6-dichlorobenzaldehyde are added in small portions to a solution, stirred at 75°C, of 45 ml of sodium bisulphite in 160 ml of water; the mixture is cooled to 8°–10°C whereafter 50 ml of ether are added and, dropwise, also a solution of 17.1 g (0.26 mol) of potassium cyanide in 40 ml of water. Stirring takes place for 1 hour at 20°C, followed by extraction twice with ether. The ethereal solutions are washed with dilute sodium bisulphite and then with water. Drying takes place, followed by evaporation to dryness under vacuum. 40.5 g of 2,6-dichloromandelonitrile are obtained.

Yield : 100 %

M.p. 80°-82°C b. Preparation of the 2,6-dichloromandelino-ethyl ether hydrochloride Hydrochloric acid gas is saturated with a solution of 40.5 g (0.2 mol) of 2,6-dichloromandelonitrile in 200 ml of ether and 40 ml of ethanol. They are left in contact overnight and hydroextracted. 46 g of product are obtained.

Yield : 81 % c. Preparation of the 2,6-dichloromandelamidine hydrochloride 10.5 g (0.035 mol) of hydrochloride prepared according to (b) above are added to 200 ml of ethanol saturated with ammonia and heated for 2 hours under reflux. Evaporation to dryness under vacuum takes place, followed by addition of 100 ml of ether and hydroextraction. Recrystallisation from isopropanol takes place. The 2,6-dichloromandelamidine is obtained.

Yield: 75 % (calculated from 2,6-dichlorobenzaldehyde)

M.p. : 264°C (with decomposition).

This product, which is obtained in the form of small white crystals, is soluble in water, methanol and ethanol and insoluble in ether and acetone.

EXAMPLE 5—
2-(α-Hydroxy-2,6-dichlorobenzyl)-Δ²-imidazoline hydrochloride (Formula X)

A solution of 22 g (0.078 mol) of 2,6-dichloromandeliminoethyl ether hydrochloride, obtained according to Example 4b, and 5 ml (0.08 mol) of ethylene diamine in 100 ml. of ethanol is heated for 2 hours under reflux and evaporated to dryness under vacuum. The evaporation residue is taken up in water, a few drops of hydrochloric acid are added, this being followed by filtration on carbon, precipitation with concentrated sodium hydroxide, hydroextraction and washing with water. The base is recrystallised from the mixture of ethanol and isopropyl ether. A solution in acetone of the base as thus obtained is acidified with hydrochloric ethanol, hydroextracted and recrystallised from the ethanol-acetone mixture.

Hydrochloride yield : 58 % (calculated from the 2,6-dichlorobenzaldehyde).

M.p. (hydrochloride) : 236°–238°C (instantaneous)

m.p. (base) : 204°–206°C.

The hydrochloride, which is obtained in the form of a white powder, is soluble in water and the alcohols and insoluble in acetone and ether.

EXAMPLE 6—
2,6-Dichloromandelamidoxime hydrochloride (Formula XI)

20.2 g (0.1 mol) of 2,6-dichloromandelonitrile are added to a solution of 21 g (0.15 mol) of hydroxylamine hydrochloride, 8.1 g (0.15 mol) of sodium methylate and 250 ml of methanol. They are left in contact overnight at 25°C and evaporated to dryness under vacuum. The mixture is taken up in water in such a way that the pH remains lower than 4, the base is filtered and precipitated with sodium hydroxide, hydroextracted, washed with water and recrystallised from ethyl acetate. The base as thus obtained is acidified in solution in acetone with hydrochloric ethanol, hydroextracted and recrystallised from ethanol.

The 2,6-dichloromandelamidoxime hydrochloride, which is obtained in the form of a white powder, is soluble in water and the alcohols and insoluble in acetone and ether.

Yield : 76 %

M.p. : 228°–230°C (with decomposition)

M.p. of the base : 134°C.

EXAMPLE 6a

The product described in Example 6 is obtained by causing the reaction of hydroxylamine hydrochloride, in the presence of $H_2CONa$, with 2,6-dichloromandelimino-ethyl ether hydrochloride.

EXAMPLE 7—
2-(α-Hydroxy-2,6-dichlorobenzyl)-1,4,5,6-tetrahydropyrimidine hydrochloride (Formula XII)

A solution of 14.25 g (0.05 mol) of 2,6-dichloromandeliminoethyl ether hydrochloride (prepared according to Example 4b) and 4.5 g (0.06 mol) of propylene diamine in 70 ml of ethanol is heated for 2 hours at boiling point. The solution is evaporated to dryness under vacuum, the residue is taken up in water, a few drops of 3N-hydrochloric acid are added, followed by filtration on carbon and making the filtrate alkaline with concentrated sodium hydroxide. Hydroextraction, washing with water and drying follow. There are obtained 12 g of 2-(α-hydroxy-2,6-dichlorobenzyl)-1,4,5,6-tetrahydroxypyrimidine.

Yield : 92 %

M.p. : 188°–190°C (with decomposition).

This base is dissolved in 200 ml of acetone. It is filtered while hot and the filtrate is acidified with hydrochloric ethanol, followed by hydroextraction and recrystallisation from water. The hydrochloride is obtained. This product is obtained in the form of small white crystals; it is soluble in methanol and ethanol, sparingly soluble in water (3 %) and insoluble in ether and acetone.

Yield: 42 %

The hydrochloride starts to melt at 155°–160°C, recrystallises and melts once again at 258°–260°C with decomposition.

There are set out below the results of the pharmacological tests which were undertaken with the products according to the invention.

As regards the toxicity, the $LD_{50}$ values are set out in the following table.

TABLE

| Example | $LD_{50}$ IV on the mouse mg/kg |
|---------|-------------------------------|
| 1 | 115 |
| 2 | 87.5 |
| 3 | 115 |
| 5 | 58.3 |
| 6 | 380 |

INVESTIGATION OF THE HYPOTENSIVE PROPERTIES OF THE PRODUCT OF EXAMPLE 1 a. With normally tensed, wakened rats

By intramuscular route

The dose administered to 6 animals is 12 mg/kg by the intramuscular route (1/10 of the $LD_{50}$ IV mouse). In 30 minutes, the arterial pressure has decreased to a maximum of 22 to 57 %. The return to normality is effected in 3 to 5 hours.

From the injection of the product, a tachycardia is developed, the cardiac frequency changes on average from 340 to 380 beats/minute in a first period, then falls again to 360 and slowly rises again to 390 beats/minute; it is maintained at this level, although the hypotension has ceased.

Orally

The animals, having received 12 mg/kg intramuscularly, then receive, (after return of the arterial pressure to its initial value), a dose of 57 mg/kg orally. The arterial pressure is lowered to the maximum of 16–44 % during a period longer than 2 hours. The cardiac frequency, increased during the first part of the test (intramuscular injection) and remaining at a high level, is lowered after the oral administration.

Another series of 6 rats receives at the outset the product of Example 1 in a dose of 57 mg/kg orally. The fall in pressure reaches as a maximum 25 to 75 % and on average 42 %. The hypotension is still about 20 %, 6 hours after the administration. A slight tachycardic effect is observed; on average, the cardiac frequency changes from 380 to 400 beats/minute.

b. As regards the dog

Using a dog anaesthetised with nembutal, an injection of 10 mg/kg intravenously of the product of Example 1 causes a fall of 40 % in the arterial pressure during the injection. The cardiac frequency is decreased by 10 % for 3 minutes, while the aortic flow and the vertebral flow are decreased by 15 %. 15 minutes later, these parameters have returned to their initial value.

c. Cardiacal Hemodynamics

The product of Example 1 is administered to a dog anaesthetised with nembutal in the dose of 3 mg/kg intravenously. On completing the perfusion, the differential arterial pressure increases by 17 % (the mean arterial pressure is not changed), and the cardiacal frequency increases by 8 %. The dp/dt ratio is constant, the vertebral rate of flow is reduced by 13 % and the femoral rate of flow is increased by 129 %. After 15 minutes, the differential pressure has returned to its initial value, but the dp/dt ratio is increased by 33 % and the cardiacal frequency by 17 %. The increase in the femoral flow is not more than 50 %.

A second injection intravenously of 6 mg/kg produces a moderated hypotension (12 %). The cardiac frequency increases by 14 %. The increase in the femoral flow is only 25 %. The vertebral flow is reduced by 13 %.

INVESTIGATION OF THE HYPOTENSIVE PROPERTIES OF THE PRODUCT OF EXAMPLE 2

The product of Example 2 was administered to 6 wakened and normally tensed rats in a dose of 45 mg/kg by intramuscular route. An immediate maximum hypotension in 4 animals is observed in 30 to 60 minutes (11 to 32 %, on average 26 %). The return to normality is effected in 4 hours for 2 animals and towards normality, starting at 4 hours, for the other two animals.

Action on a dog which is awake

The product of Example 2 is administered orally in a dose of 50 mg/kg to a normally tensed, dog, which is awake. During the 5 hours of observation, the pressure does not undergo any significant variation. From the second hour, the frequency falls to reach $-20\%$ at the 5th hour, but it does not seem that this action can be imputed to the product. It has to be noted that this dose is small.

Administered in a dose of 9 mg/kg IV (1/10 of the $LD_{50}$ IV mouse) to a dog anaesthetised with nembutal, the product of Example 2 lowers the arterial pressure by 14 % on completing injection. The cardiac frequency decreases by 13 %, the aortic flow by 23 % and the vertebral flow by 50 %.

PROPERTIES OF THE PRODUCT OF EXAMPLE 3

The hypotensive properties of the product of Example 3 were investigated in connection with a wakened rat. The product of Example 3, applied orally in the dose of 60 mg/kg to two normally tensed rats and 3 rats subject to hypertension lowers the arterial pressure by 13 %. This effect is especially noticeable on three animals out of five (two under hypertension and one under normal tension); it is extended for more than 4 hours. The cardiac frequency is lowered during 1 hour from 320 to 300 beats/minute and then is raised to 350 beats/minute and remains approximately at this level for at least 3 hours.

During a second series of experiments, 120 mg/kg of product were administered orally to six rats (five under normal tension and one hypertensioned); it is observed that the arterial pressure is lowered on average by 25 % during at least 3 hours.

PROPERTIES OF THE PRODUCT OF EXAMPLE 5

The hypotensive properties of the product of Example 5 were also studied in connection with the wakened rat. Administered intraperitoneally to five animals under normal tension, in the dose of 30 mg/kg, the product decidedly lowers the arterial pressure. At the point of maximum action, 30 minutes after injection, the arterial pressure has decreased by 53 %. It then rises slowly, but it is still reduced by 25 %, 6 hours after injection. Concurrently, there is also observed a decrease in the cardiac frequency, which changes on average from 375 beats/minute to 315 beats/minute.

Administered orally in the same dose, i.e. 30 mg/kg, the product of Example 5 reduces the arterial pressure by 13 to 30 % in 4 rats under normal tension and 1 rat under hypertension. On average, at the point of maximum action, 1 hour after ingestion, the arterial pressure is lowered by 20 % and the return to normal is effected in 3 hours. The cardiac frequency is slightly reduced. It changes to 280 beats/minute. This effect disappears in 1 hour.

PROPERTIES OF THE PRODUCT OF EXAMPLE 6

A. With the wakened animal
 1. Rat
  a. Intraperitoneally

Two normally tensed rats receive intraperitoneally (I.P.) 225 mg/kg of product. Their pressure falls respectively by 60 % and 67 % in 30 minutes and, 4 hours later, one has been restored to its initial pressure, while the other still shows a hypotension of 35 %. During this time, the cardiac frequency falls; it changes on average from 350 to 250 beats/minute.

Four rats which are under hypertension (by daily subcutaneous injection for 4 weeks of 3 mg/kg of DOPA) receive intraperitoneally 225 mg/kg of product. One of them dies in 1 hour of hypotension. The three others show a low average arterial depression of 70 %, 30 minutes after the injection. This hypotension is still 40 % after 4 hours. Simultaneously, the cardiac frequency falls on average from 360 to 250 beats/minute.

b. Orally

Four normally tensed rats receive perorally 225 mg/kg of product. One rat dies 1 hour after the ingestion. In the other three rats, there is observed a fall in the arterial pressure of 40 % on average, the effect occurs in 30 minutes and its intensity varies according to the animal (28 to 50 %) but it affects all of them. The duration of this hypotension is more than 6 hours. Four other rats receive perorally 112 mg/kg of product. One rat does not show any hypotension; in the other three rats, there is observed a fall in arterial pressure of a maximum of 40 % in 30 minutes to 1 hour; the initial values are still not reached, 4 hours after administering the product. The cardiac frequency is not clearly modified.

Five hypertensioned rats (Cellophane) receive 112 mg/kg of product perorally. All show a hypotension, of which the maximum varies from 20 to 57 % (average 29 %); it reaches its maximum in 30 minutes to 1 hour. With two rats, the arterial pressure remains at this level for more than 4 hours. With the other three rats, the arterial pressure has been restored in 4 hours to its initial value; two successive doses of 110 mg/kg of product are administered perorally to two of these rats and the arterial pressure falls strongly in 15 minutes; it reaches its minimum, which corresponds to 48 %, for the two rats; a fresh peroral dose of 110 mg/kg does not cause its level to fall further. The cardiac frequency of the rats decreases with the first ingestion of product from 370 to 320 beats/minute in 60 minutes, remains at this level for at least 4 hours. The following successive doses cause variable effects on the cardiac rhythm.

2. Dog
   a. Intravenously

Three dogs receive intravenously 10 mg/kg of product. One of these animals reacts very strongly; its arterial pressure, after having fallen by 63 % in 40 minutes, returns almost to its initial value 1¼ hours after the injection; the cardiac frequency during this time changes from 84 to 116, then 72, then 120. A second dose of 10 mg/kg gives the same effect on the arterial pressure as the first dose, but with a slower return (4 hours), the cardiac frequency rising up to 145 beats/minute; a fresh injection of 20 mg/kg causes the arterial pressure to fall, always to the same level (i.e., 50 mm.Hg.). In this test, the differential arterial pressure is decreased, the systolic having a tendency to fall more than the diastolic.

As regards the other two animals, the dose of 10 mg/kg reduces the arterial pressure by 25 %, the cardiac frequency being increased (88 to 116 and 116 to 128 in 30 and 40 minutes, respectively). The differential is not changed. On one of these dogs, the arterial pressure and the cardiac frequency have been restored to their initial level in 3 hours. As regards the other animal, 1½ hours after the first administration, a second dose of 10 mg/kg is injected intravenously, which causes a hypotension of 33 % and a change in the cardiac frequency from 116 to 140 beats/minute, while a third identical dose does not cause any further modification of the parameters.

b. Orally

Two dogs receive orally the dose of 50 mg/kg of product and neither the arterial pressure nor the cardiac frequency are modified A fresh dose of 50 mg/kg reduces the arterial pressure of one of them by a maximum of 25 % (at 60 minutes), this hypotension lasting for more than 2 hours. The differential arterial pressure is slightly reduced by a larger decrease in the systolic than the diastolic; the cardiac frequency increases; it reaches 130 beats/minute (85 before product). A third dose of 50 mg/kg is necessary for reducing the arterial pressure of the second dog; the hypotension is 33 % in 15 minutes and lasts for more than 1 hour. The differential arterial pressure increases by considerable reduction in the diastolic arterial pressure. During this time, the cardiac frequency increases considerably, since it reaches 180 beats/minute.

3. Rabbit

Three rabbits received intravenously four successive doses of 10 mg/kg of product, every 10 minutes, and then doses of 20 mg/kg One rabbit does not show any hypotenion, even at the total dose of 700 mg/kg. The cardiac frequency changes from 250 to 200 beats/minute for the dose of 190 mg/kg. As regards the other two rabbits, a hypotension is observed from the second injection of 10 mg/kg, to the order of 10 %, and the cardiac frequency measured on only one of these animals is not changed at this dose. With the following doses, the arterial pressure continues to fall to a maximum of 42 % for one of them at the dose of 60 mg/kg, and of 31 % for the other at the dose of 160 mg/kg, the frequency of this latter changing from 300 to 230 beats/minute.

It must be noted that, from the dose of 380 mg/kg, laboured breathing and trembling of the head with nystagmus are observed.

B. As regards the anaesthetised animal

1. Rat (urethane)

Three rats received the product intravenously at the rate of 10 mg/kg every 10 minutes. Their arterial pressure starts to fall from the first dose, then decreases with each injection to 45 to 50 % for the overall doses of 30 to 50 mg/kg.

The cardiac frequency decreases when the dose increases, so as to reach its maximum of decrease (change from 340 to 210 on average) at 40 mg/kg.

2. Cat (Nembutal)

Two cats received the product intravenously at the rate of two injections of 10 mg/kg and then 20 mg/kg.

On a bivagotomised cat, the first dose causes the arterial pressure to fall by 42 % in the 5 minutes following the injection. The two other doses of 10 and 20 mg/kg do not cause any further fall in its level. The cardiac frequency, which is 165 beats/minute at the start of the test, decreases progressively to reach 100 beats/minute after three doses of product.

On the other etatropined, bivagotomised cat, the two doses of 10 mg/kg both reduce the arterial pressure equally, i.e., 14 % in 5 minutes; the dose of 20 mg/kg causes a hypotension of 36 %, which lasts longer than 1 hour. The cardiac frequency decreases progressively when the dose increases; it passes overall from 220 at the start of the test to 160 beats/minute.

3. Dog (Nembutal)

The product is injected intravenously to four dogs.

One dog receives successive doses intravenously of 10 mg/kg.

It is necessary to have the second dose of 10 mg/kg for obtaining a hypotension of 15 % in 15 minutes; four other doses of 10 mg/kg injected every 10 minutes cause a progressive fall in the arterial pressure by 36 %. Neither the differential arterial pressure nor the cardiac frequency are modified.

Two dogs receive a single dose of 40 mg/kg IV of product; the average arterial pressure decreases by 14 % in one of them and 28 % in the other, but the differential arterial pressure is unchanged and the cardiac frequency changes on average from 160 to 140 beats/minute, this happening in 5 minutes. The observation was not continued (end of test).

One dog receives increasing intravenous doses of product, 10 mg/kg; neither the arterial pressure nor the cardiac frequency are modified;

+ 20 mg/kg : hypotension of 24 % in 5 minutes and lasting more than one hour, the cardiac frequency is unmodified.

+ 40 mg/kg: hypotension of 28 % in 5 minutes, 33 % in 15 minutes and 50 % in 1 hour, the differential arterial pressure decreases with a larger fall in the systolic than the diastolic, the cardiac frequency of 195 beats/minute falls progressively to 160 beats/minute, 1 hour after the injection.

In human beings, during clinical tests, the products of Examples 3 and 5 are proved to be active in the dose of 20 mg administered twice a day in the form of gelatine-coated pills for the product of Example 3 and in the dose of 5 to 10 mg administered three times a day for the product of Example 5.

The product of Example 6 gave good results in clinical tests on humans in the dose of 50 mg twice to four times a day in the form of a gelatine-coated pill.

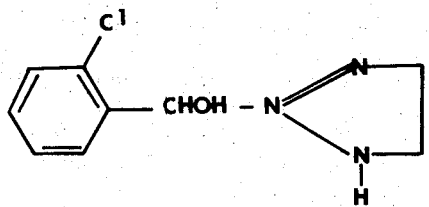

(VI)

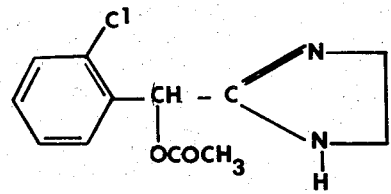

(VII)

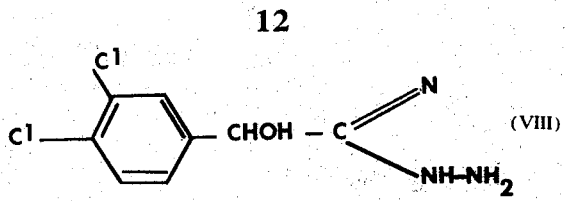

(VIII)

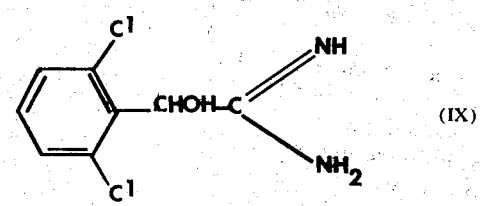

(IX)

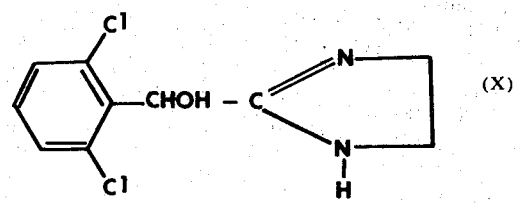

(X)

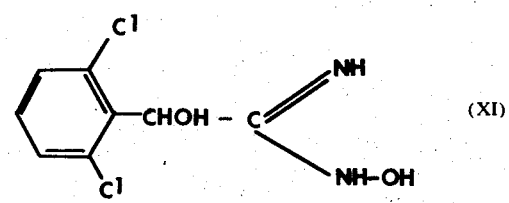

(XI)

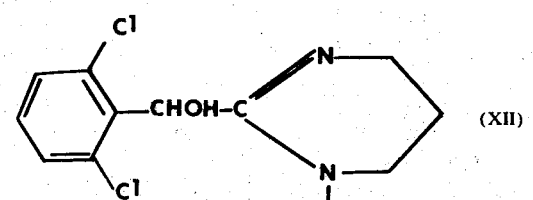

(XII)

I claim:
1. 2,6-Dichloromandelamidoxime.

* * * * *